United States Patent [19]

Speedie

[11] Patent Number: 4,956,897
[45] Date of Patent: Sep. 18, 1990

[54] CAM CLEAT

[75] Inventor: Robert Speedie, Sandringham, Australia

[73] Assignee: Ronstan International Pty. Ltd., Sandringham, Australia

[21] Appl. No.: 369,146

[22] Filed: Jun. 21, 1989

[30] Foreign Application Priority Data

Jun. 21, 1988 [AU] Australia ................. PI8902

[51] Int. Cl.⁵ .......................................... F16G 11/00
[52] U.S. Cl. ................................ 24/134 P; 24/134 R
[58] Field of Search ......... 24/134 R, 134 P, 134 KA, 24/134 KB, 134 L, 134 N

[56] References Cited

U.S. PATENT DOCUMENTS

| | | | |
|---|---|---|---|
| 564,012 | 7/1896 | Fraser | 24/134 P |
| 1,265,141 | 5/1918 | Trippe | 24/134 P |
| 1,447,456 | 3/1923 | Wright | 24/134 R |
| 1,520,716 | 12/1924 | Judd | 24/134 P |
| 2,444,841 | 7/1948 | Meronk | 24/134 P |
| 4,414,910 | 11/1983 | Renton | 24/134 P |
| 4,766,835 | 8/1988 | Randall et al. | 24/134 P |

Primary Examiner—Victor N. Sakran
Attorney, Agent, or Firm—Birch, Stewart, Kolasch & Birch

[57] ABSTRACT

A cam cleat includes at least two gripping members mounted in space apart relation. The gripping members provide a line gripping passage therebetween through which a line can extend. At least one of the gripping members includes a cam shaped gripping pawl mounted on a base member for pivotal movement relative to the upper gripping member. Movement of the gripping pawl toward the other gripping member closes the line gripping passage so that a line in the passage is gripped between the gripping members. Each gripping pawl has a pair of gripping surfaces arranged in symmetrical relation so that one of the pair of gripping surfaces engages the line during gripping. The surface allocated for gripping depends on the orientation of the gripping pawl relative to the other gripping member.

14 Claims, 2 Drawing Sheets

CAM CLEAT

The present invention relates to improvements in cam cleats.

Cam cleats of various designs have been known and used for a number of years. In particular, they are used to secure lines. In one application they are used to secure lines on sailing craft and preferably allow quick securing and release of said lines. In most designs, the cam cleats comprise a pair of facing pawls that are rotatably mounted about a pair of adjacent shafts, said shafts generally being integral with a base plate. Generally, the pawls are spring biased so that they are biased toward a gripping position. Adjacent faces of the pawls include gripping teeth and said faces are shaped such that when rotated the distances between them increases to accomodate lines of varying diameter.

These cam cleats have suffered a number of disadvantages. Generally it has been necessary to produce left handed and right handed components for each cleat which requires expensive tooling for each component. Excess stock must be held for manufacture and repair due to the one sided nature of each component. Also movement of lines through the cleats causes wearing on the gripping teeth. In more recent prior art cleats ball or roller bearings having been provided to reduce friction of the swinging action of the cams. These balls or bearings can become lost and/or dirt/sand can become built up around or lodged between them substantially reducing the efficiency of the cleat.

According to the present invention there is provided a cam cleat including at least two gripping members mounted in spaced apart relation, the gripping members providing a line gripping passage therebetween through which a line can extend; at least one of the gripping members including a cam shaped gripping pawl mounted on a base member for pivotal movement, relative to the or at least one other gripping member, movement of the gripping pawl toward the other gripping member closing the line gripping passage until a line therein is gripped between the gripping members; the or each gripping pawl having a pair of gripping surfaces arranged in a symmetrical relation so that one or other of the gripping surfaces engage the line during gripping, the surface allocated for gripping depending on the orientation of the gripping pawl relative to the other gripping member. It is an object of the present invention to provide a cam cleat which has a number of substantially symmetrical components.

The attached drawings show:

The drawings showing preferred embodiments of the invention are attached to assist in understanding the invention but the particularity of those drawings is not to be understood as superseding nor in any other way limiting the generality of the preceding description.

Figure 1:
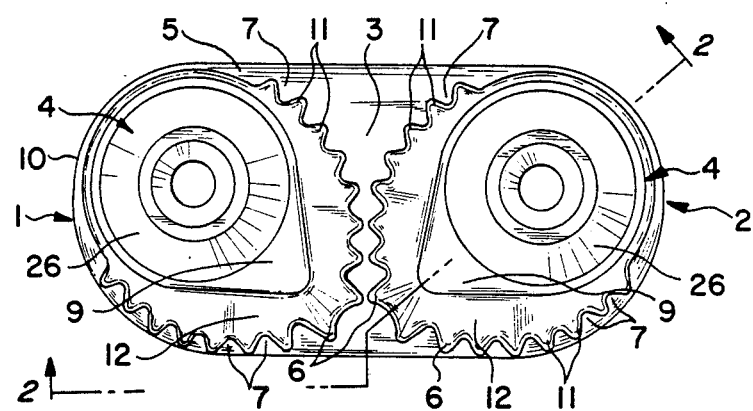
FIG. 1 shows a top view of one embodiment of a cam cleat according to the invention.
Figure 2:
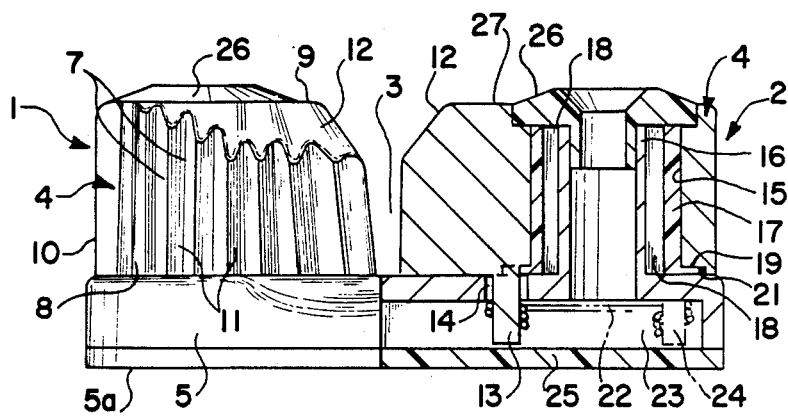
FIG. 2 shows a side view of the cam cleat of FIG. 1 with a sectional view 2—2 of one side.

According to one embodiment of the present invention, there is provided a cam cleat as shown in FIGS. 1 and 2 including two gripping members 1 and 2 mounted in spaced apart relation, gripping members 1 and 2 providing a line gripping passage 3 therebetween through which a line can extend. Each of gripping members 1 and 2 include a cam shaped gripping pawl 4 mounted on base member 5 for pivotal movement, relative to the other gripping member. Movement of the one gripping pawl 4 toward the other gripping member closes line gripping passage 3 until a line therein is gripped between gripping members 1 and 2. Gripping pawl 4 has a pair of gripping surfaces 6 and 7 arranged in symmetrical relation so that one or other of the surfaces engage said line during gripping, the surface allocated for gripping depending on the orientation of one gripping pawl 4 relative to the other gripping member.

Figure 3:
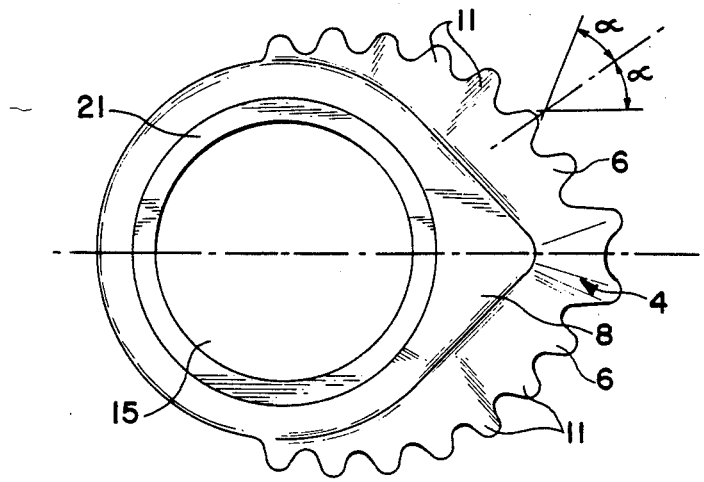
FIG. 3 shows a top view of one embodiment of a pawl according to the invention.

Each pawl is substantially symmetrical about a plane which is parallel to the axis of rotation of said pawl. Said symmetry plane extends through said axis of rotation. Each pawl 4 has a bottom face 8. Remote from bottom face 8 is stop face 9. FIG. 3 shows top face 8 and one line of substantial symmetry. Side faces 10 extend between bottom face 8 and to face 9.

Gripping teeth 11 are provided on a portion of side faces 10. Teeth 11 are shaped such that one or more of them will interact with an object placed in gripping passage 3 in abutment with gripping teeth 11 to stop the object being drawn through the cam cleat in one direction. Teeth 11 are generally substantially parallel. It will be appreciated that teeth 11 or sections of them may be inclined at different angles relative to each other to provide different gripping or release characteristics. As shown a major portion of the projections of teeth 11 in the vicinity of bottom face 8 are substantially parallel and are set substantially perpendicular relative to bottom face 8. In another form some or all of the projections of teeth 11 in the vicinity of bottom face 8 may be angled between 0° and about 15° from the perpindicular relative to the bottom face 8. It will be appreciated that a portion of teeth 11 in the vicintiy of top face 9 may be flared outwardly and/or swept towards the exit side of the cleat or otherwise arranged to assist in receipt of the line. This embodiment of the teeth is not depicted. Further, portions of one or more of teeth 11 may be inclined at different angles relative to other portions of teeth 11 to enhance gripping and/or release characteristics. Teeth 11 have a profile such that it will not shred line. Outer sections of projections of teeth 11 are rounded. In one form the radius of rounded outer sections of teeth 11 is about 0.75 mm. The angle between two inclined planes which intersect to form each tooth and an imaginary vertical intersecting line is preferably between 5° and 20°. As shown, said angle is between 10° and 12°.

Teeth 11 may extend the full length between bottom face 8 and top face 9. As shown, top face 9 and side face 10 in the vicinity of top face 9 is curved or bevelled 12. Bevel 12 assists in allowing a line or other object to be inserted into the cam cleat easier and more efficiently than if the curve or bevel was absent.

Figure 4:
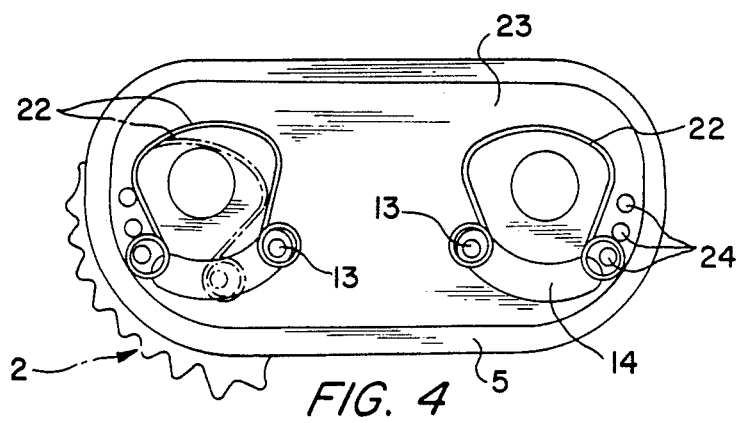
FIG. 4 shows a bottom of the cam cleat of FIG. 3 with the base cap removed and showing one pawl having been rotationally moved.

Bottom face 8 of pawl 4 is substantially flat. Bottom face 8 is substantially complimentary to base member 5 proximate thereto. As shown, finger 13 extends from bottom face 8 of pawl 4 substantially perpendicular to bottom face 8. Finger 13 cooperates with a recess 14 in base member 5 to limit the degree of rotation of pawl 4 about shaft 16 (see FIG. 4). In another embodiment, limit on rotation may be achieved by a finger which may be provided on a base member and a recess provided within the bottom face of the pawl. In yet another embodiment, a rotation limiting means may be provided in the region of the top face or within the passage. It will be appreciated that a limit on rotation may be provided by any suitable means.

Pawl 4 has passage 15 extending therethrough. Shaft 16 extends into passage 15.

Shaft 16 is hollow in construction but in another embodiment it may be solid. Shaft 16 extends through substantially the whole length of passage 15 of pawl 4. However, it will be appreciated that in another embodiment shaft 16 may extend completely through or only partway through passage 15. Shaft 16 is substantially circular in cross-section. As shown, shaft 16 is integral with base member 5. However, it will be appreciated that in another embodiment the shaft may be attached to the base member or shaft/s may be provided independently for use where no base member is provided. Base member 5 includes a substantially flat mounting surface 5a. The corners of the top of base members are rounded or bevelled. Shaft 16 extends substantially perpendicular to a plane of said mounting surface.

Figure 5:
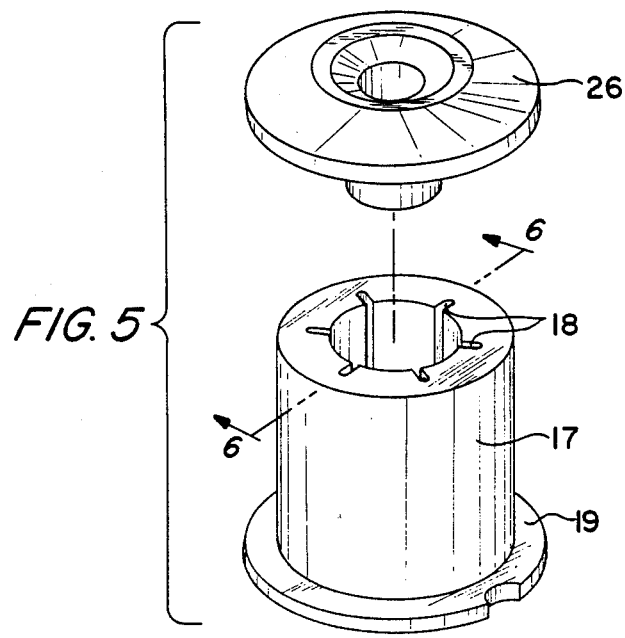
FIG. 5 shows a head member and bearing member including support means of the cam cleat of FIG. 1.

Bearing members are provided within passage 15 of pawl 4. In one form, bearing members may be integral with or connectable about the shaft or a portion of the shaft. Bearing members may be in any suitable form including but not limited to roller bearings, ball-bearings, bearing surfaces or the like or a combination of these. As shown, a bearing sleeve 17 substantially of cylindrical form is provided. Bearing sleeve 17 is depicted in greater detail in FIGS. 5 and 6. Bearing sleeve 17 has interruptions 18 in its surface to allow wear debris and other extraneious material to be substantially removed from the rubbing surfaces. As shown the interruptions are provided by a series of grooves. However, it will be appreciated that the interruptions may be of any suitable size or shape including slots or grooves and/or radial holes. As shown, grooves 18 are substantially parallel with the axis of passage 15/shaft 16. A base portion 19 of bearing member 17 extends partially beyond the length of passage 15.

Abutment means support pawl 4 so that base 8 of pawl 4 does not rub against base member 5. As shown, abutment means are provided by plate 19 of bearing member 17. It will be appreciated that such abutment means may be provided by various means including a platform integral with, attached, to or mounted in the vicinity of base member 5 and shaft 17. Friction reducing projection 20 is included on abutment means 19 to assist in supporting pawl 4 whilst reducing friction created by moving pawl 4 relative to base member 5. Abutment projection 20 comprises a substantially circumferential bead proximate base member 5. It will be appreciated that more than one friction reducing projection may be provided. It will be appreciated that friction reducing means of various known types could be used to, support pawl 4 whilst reducing friction between pawl 4 and base member 5.

Bottom face 8 of pawl 4 includes a recess 21 into which abutment means 19 partially inserts.

Bearing member 17 and abutment means 19 are made of any suitable material. Said material preferably has good wear and distortion resistant characteristics. Preferably said material has low corrosion character. Suitable materials include polymeric materials and metals including plastic, ceramic, metal, teflon, aluminium and the like or a combination or plurality of these. In one embodiment, the bearing members and support means are made of a low friction material such as acetal, P.T.F.E. acetal, DELRIN (registered trade mark) or any other lower friction material.

Resilient member 22 is provided to cooperate with pawl 4 to urge movement of pawl 4 toward a gripping position. As shown, resilient member 22 comprises a coil compression spring. It will be appreciated that the resilient member may be provided by any known means including an elastic member or a tension spring. Resilient member 22 is substantially U shaped. Resilient member 22 demountably connects with finger 13 which extends from bottom face 8 of pawl 4. Recess 23 is provided in base member 5 to receive resilient member 22. Recess 23 is in the underside of base member 5. In another embodiment, a recess to receive the resilient member may be provided elsewhere in the cam cleat, for example in the bottom face of the pawl. In yet another embodiment a recess may be provided in the top face of the pawl to receive the resilient member.

Adjustment means is provided to adjust the degree of urging of resilient member 22. As shown a series of adjustment protruberences 24 are provided. Resilient member 26 detachably connects with protruberences 24. It will be appreciated that adjustment means may be provided by various means and may include a series of adjustment recesses. Adjustment protruberences 24 are arranged such that movement of at least one end of resilient member 22 from one to another of protruberances 24 will alter the compression or tension of resilient member 22. Adjusment protruberences 24 are provided on underside of base member 5. As shown protruberances 24 are arranged substantially in a row.

Base member cap 25 is provided to cover recess 23 in the underside of base member 5. Base member cap 25 also provides a seating surface. Base member cap 25 is made of any suitable material including polymeric materials, plastic, silicon or the like.

Head member 26 is provided to cooperate with top face 9 of pawl 4. Head member 26 in conjunction with fastening means may assist in maintaining pawl 4 in place in the cam cleat during normal operation. Head member 26 preferably cooperates with fixing means to affix the cam cleat to an object for use. Head member 26 demountably connects with shaft 16. The distance between base member 5 and the underside of head member 26 proximate the pawl is at least slightly greater than the length of passage 15 in the pawl so as to allow slight movement of pawl 4 up and down along shaft 16. In normal operation head member 26 does not continuously contact top face 9 of pawl 4 and thereby does not create substantial friction therewith for substantial lengths of time.

In one embodiment not depicted, a head member or top section of the pawl may include resilient member adjustment and/or loading means. In one embodiment, said head member includes a lug or finger. Said lug or finger may cooperate with a recess, or slot provided in shaft such that when assembled, said head member will not substantially rotate relative to said shaft. Said head member may include a series of adjustment protruberences or recesses which may cooperate with said resilient member. One or more recesses may be provided in the region of said top face of said pawl, one or more of which may cooperate with said resilient member. By rotation of said head member with said resilient member. By rotation of said head member relative to said shaft followed by location of the lug or finger in said shaft recess the resilient member tension or compression may be adjusted. Recess 27 is provided in the top face 9 of the pawl into which at least a portion of head member 26 inserts. Recess has a diameter slightly larger than the diameter of head member 26.

Figures 6, 7:
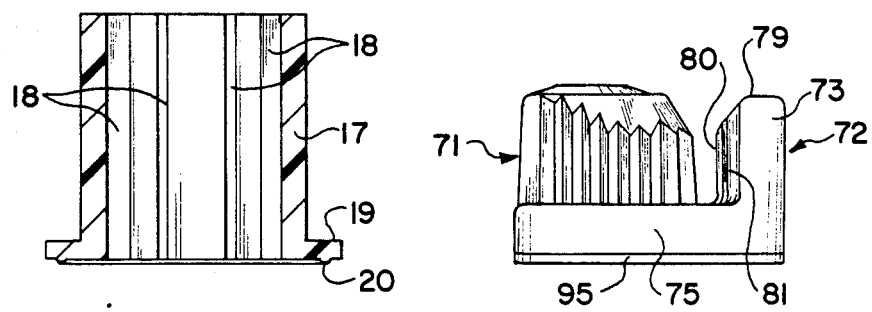
FIG. 6 shows a section 6—6 of the bearing member including support means of FIG. 5.
FIG. 7 shows another embodiment of a cam cleat according to the invention.

In FIG. 7 there is depicted another embodiment of a cam cleat according to the invention. As shown there is provided gripping members 71 and 72. Gripping member 71 is substantially the same as gripping members 1 or 2 as described above with reference to FIGS. 1 to 6 inclusive. Gripping member 72 comprises fixed abutment member 73. Abutment member 73 is integral with base member 75. It will be appreciated that abutment member 75 may in different embodiments be separate from or attachable to base member 75. Abutment member 73 includes top face 79 and side faces 80. One or more of side faces 80 include teeth 81. Top face 79 and side face 80 in the vicinity of top face 79 is bevelled. Base member cap 95 is provided.

It will be appreciated that the invention would be suitable without a base member being provided for example the gripping member/s could be fastened directly to a vessel or other object. In such an embodiment resilient member and/or one or more fingers could be provided in the vicinity of the base and/or top of each gripping member.

Base member, shaft and pawl may be made of any suitable shape, size or material. Preferably the base member, shaft and/or pawl are made of metal, polymeric material, ceramic or a combination of these. In one form, base member and pawl are made of aluminium.

Various alterations, modifications and/or additions may be introduced into the constructions and arrangements of parts previously described without departing from the spirit and ambit of the invention as defined by the appended claims.

I claim:

1. A cam cleat including at least two gripping members mounted in spaced apart relation, the gripping members provided a line gripping passage therebetween through which a line can extend; at least one of the gripping members including a cam shaped gripping pawl mounted on a base member for pivotal movement, relative to the or at least one other gripping member, movement of the gripping pawl toward the other gripping member closing the line gripping passage until a line therein is gripped between the gripping members; the or each gripping pawl having a pair of gripping surfaces arranged in a symmetrical relation so that one or other of the gripping surfaces engage the line during gripping, the surface allocated for gripping depending on the orientation of the gripping pawl relative to other gripping member.

2. A cam cleat as claimed in claim 1 wherein each gripping pawl is substantially symmetrical at least about a plane which is parallel to the axis of rotation of said pawl.

3. A cam cleat as claimed in claim 2 wherein said symmetry plane extends through said axis of rotation.

4. A cam cleat as claimed in claim 1 wherein each gripping pawl is substantially symmetrical at least about a plane which is parallel to the axis of rotation of said pawl and has one or more side faces including grippig teeth on at least a portion of at least one side face.

5. A cam cleat as claimed in claim 1 wherein each gripping pawl is substantially symmetrical at least about a plane which is parallel to the axis of rotation of said pawl and has one or more side faces including gripping teeth on at least a portion of at least one side face sections of gripping teeth at least proximate a bottom face of the gripping pawl are angled between 0° and 15° from the perpendicular to the bottom face.

6. A cam cleat as claimed in claim 1 wherein each gripping pawl is substantially symmetrical at least about a plane which is parallel to the axis of rotation of said pawl and has one or more side races including gripping teeth on at least a portion of at least one side face at least some portion of some of said gripping teeth are inclinded at different angles relative to each other.

7. A cam cleat as claimed in claim 1 wherein each gripping pawl is substantially symmetrical at least about a plane which is parallel to the axis of rotation of said pawl and has one or more side faces including gripping teeth on at least a portion of at least one side face two inclined planes intersect to form each tooth and the angle between each inclined plane and an imaginary intersection line is between 10° and 12°.

8. A cam cleat as claimed to claim 7 inclusive wherein a rounded radius being about 0.75 mm connects said two inclined planes.

9. A cam cleat as claimed in claim 1 wherein each gripping pawl is substantially symmetrical at least about a plane which is parallel to the axis of rotation of said pawl and has one or more side faces including gripping teeth on at least a portion of at least one side face each gripping pawl has a passage extending therethrough into which a shaft is located and at least one bearing member is provided therebetween.

10. A cam cleat as claimed in claim 9 wherein at least one of said bearing member/s includes interruptions in its surface to assist movement of extranious material from rubbing surfaces.

11. A cam cleat as claimed in claim 1 wherein each gripping pawl is substantially symmetrical at least about a plane which is parallel to the axis of rotation of said pawl and has one or more side faces including gripping teeth on at least a portion of at least one side face each gripping pawl has a passage extending therethrough into which a shaft is located and at least one bearing member is provided therebetween said interruptions are in the form of grooves wherein at least one of said bearing member/s includes interruptions in its surface to assist movement of extranious material from rubbing surfaces.

12. A cam cleat as claimed in claim 11 wherein a abutment means is provided between each pawl and any base member.

13. A cam cleat as claimed in claim 12 wherein said abutment includes at least one friction reducing projection.

14. A cam cleat as claimed in claim 4 wherein at least one resilient member is provided to urge movement of each pawl toward a gripping position and adjustment means are provided to adjust the degree of urging of said resilient member/s.

* * * * *